N. Starr, Jr.
Harrow
No. 72334
Patented Dec. 11, 1867

Inventor;
Nicholas Starr Jr.

Witnesses;
Chas Foster
J. H. Palmer

United States Patent Office.

NICHOLAS STARR, JR., OF HOMER, NEW YORK.

Letters Patent No. 72,334, dated December 17, 1867.

IMPROVEMENT IN HARROWS.

*The Schedule referred to in these Letters Patent and making part of the same.*

TO ALL WHOM IT MAY CONCERN:

Be it known that I, NICHOLAS STARR, Jr., of Homer, in the county of Cortland, and State of New York, have invented a new and useful Improvement in Harrows; and I do hereby declare that the following is a full, clear, and exact description of the construction and operation of the same, reference being had to the annexed drawings making a part of this specification, in which—

Figure 2:
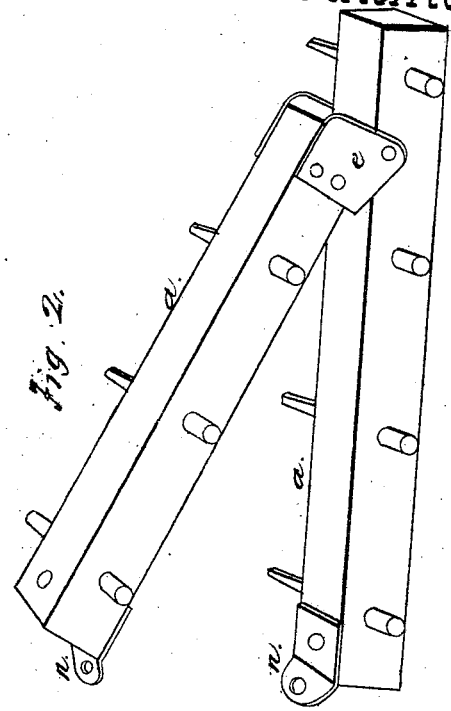
Figure 2 is a view of a part of the harrow.
Figure 1:
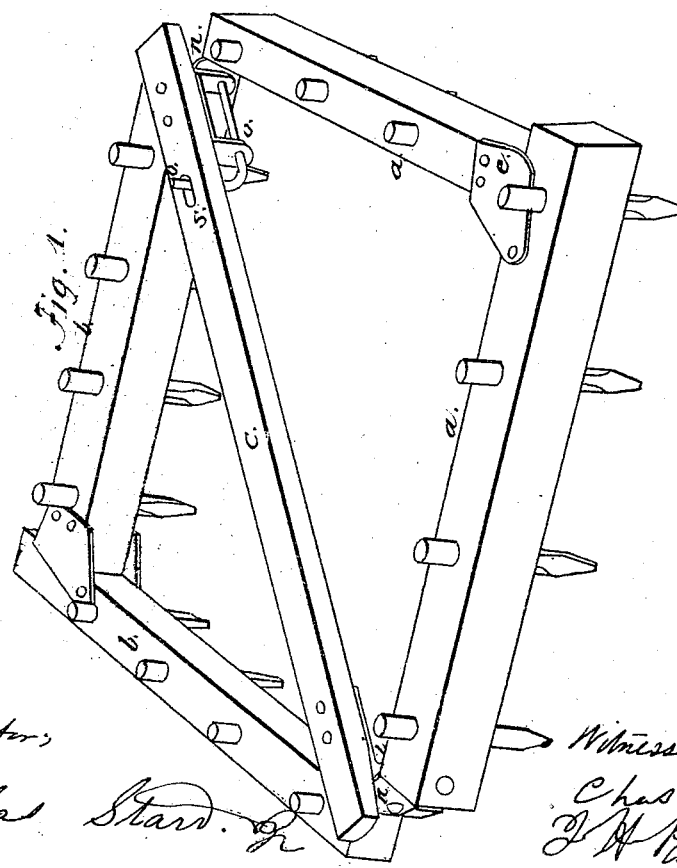
Figure 1 is a perspective view.

The harrow is made square, or nearly so, the four sides containing the teeth. The sides are made of single pieces of timber of any size desired, and hinged in pairs, as in fig. 2; the pieces $a\ a$, in fig. 1, forming one pair, and the pieces $b\ b$ another. Upon the ends of each pair of side pieces are placed bent iron straps, $n\ n$, with holes for bolts at their outer ends. $c$ is a coupling-rod, for coupling the two pairs together, having a stationary bolt, $i$, at one end, and a movable bolt, $o\ o$, at the other, the bent end of the latter bolt coming through and working in the slot $s$ of the coupling-rod. The draught may be from either corner of the drag, but it will be found to work the best to be drawn from one of the hinged corners. I thus form a flexible drag or harrow, which, I claim, accommodates itself more perfectly to the inequalities of the ground than any of those divided at right angles to the sides, and it is readily coupled together or taken apart in the field, and, what is also very desirable, it may be compactly folded for storage or transportation.

What I claim, and desire to secure by Letters Patent, is—

1. Constructing a harrow of four sides, in two sections or divisions, and each division composed of two sides hinged together, and said divisions connected at the diagonal corners to form a single square harrow.

2. I claim the connecting or coupling-rod $c$, with its bolts at either end, to connect such divisions together and keep the sides expanded.

NICHOLAS STARR, Jr.

Witnesses:
S. R. HUNTER,
J. H. PALMER.